Oct. 22, 1946.  W. H. BIXBY  2,409,610
VOLTAGE REGULATION
Filed Jan. 31, 1945

INVENTOR
W. H. BIXBY
BY
G. F. Heuerman
ATTORNEY

Patented Oct. 22, 1946

2,409,610

UNITED STATES PATENT OFFICE 2,409,610

VOLTAGE REGULATION

William H. Bixby, Detroit, Mich., assignor to Donald R. Middleton and Stanley M. Hanley, doing business as Power Equipment Company, Detroit, Mich., a copartnership Application January 31, 1945, Serial No. 575,462

4 Claims. (Cl. 171—119)

1

This invention relates to voltage regulation and particularly to voltage regulators of the electromagnetic type.

An object of the invention is to provide an improved voltage regulator of the electromagnetic type.

A voltage regulator constructed in accordance with the present invention comprises an inductance device, which because of its operating characteristics may be called a saturable reactor, having a first winding on a magnetic core connected in a circuit through which current from an alternating current source is supplied to a load. There is employed a second inductance device, which because of its operating characteristics may be called a saturated reactor, having a winding to which is supplied alternating current the amplitude of which varies in response to line voltage changes. A first rectifier energized by current which varies in response to changes in load current supplies direct current to a second winding on the core of the saturable reactor. The current supplied to the winding of the saturated reactor energizes a second rectifier which in turn supplies direct current to a third winding on the core of the saturable reactor. The first winding of the saturable reactor thus sets up an alternating magneto-motive force in a magnetic circuit formed by the core of the saturable reactor. The second and third windings of the saturable reactor respectively set up direct magnetomotive forces in the magnetic circuit for controlling the reluctance of the core and therefore the impedance of the first winding, the direct magnetomotive forces being in opposed relationship in the magnetic circuit. The saturable reactor operates over a portion of its magnetization characteristic curve such that the rate of change of inductance of its first winding with respect to the direct current magnetization of the core is large. An increase of load current, for example, causes the current supplied to the second winding of the saturable reactor to increase. The impedance of the first winding of the saturable reactor is thereby caused to decrease thus tending to prevent a reduction in load voltage. When an increase in line voltage occurs, the direct current supplied to the third winding of the saturable reactor is increased, thus increasing the magnetomotive force set up in the magnetic circuit due to the direct current flowing through the third winding of the saturable reactor. The resultant direct magnetomotive force in the magnetic circuit, which is the magnetomotive force set up by the second winding minus

2 the magnetomotive force set up by the third winding, is therefore reduced and the impedance of the first winding of the saturable reactor is increased, thus minimizing or tending to prevent a rise in load voltage.

The saturated reactor operates over a portion of its magnetization characteristic curve such that the rate of change of voltage drop across its winding with respect to the current through its winding is small so that the current through the winding rises rapidly as the voltage of the source is increased, and vice versa. It has been found that when the third winding of the saturable reactor is not used for producing a direct current magnetomotive force in its magnetic circuit due to the alternating current flowing in the path including the winding of the saturated reactor, in order to obtain satisfactory voltage regulation a high amplitude current through the winding of the saturated reactor had to be employed. This resulted in the circuit having a low power factor, that is, the impedance looking into the circuit at the input terminals had a low ratio of alternating current resistance to impedance. This undesirable condition is remedied in accordance with the present invention by providing the third winding on the core of the saturable reactor and supplying to this winding a direct current varying with the amplitude of the alternating current supplied to the winding of the saturated reactor.

The invention will now be described with reference to the accompanying drawing in which.

Figure 1:
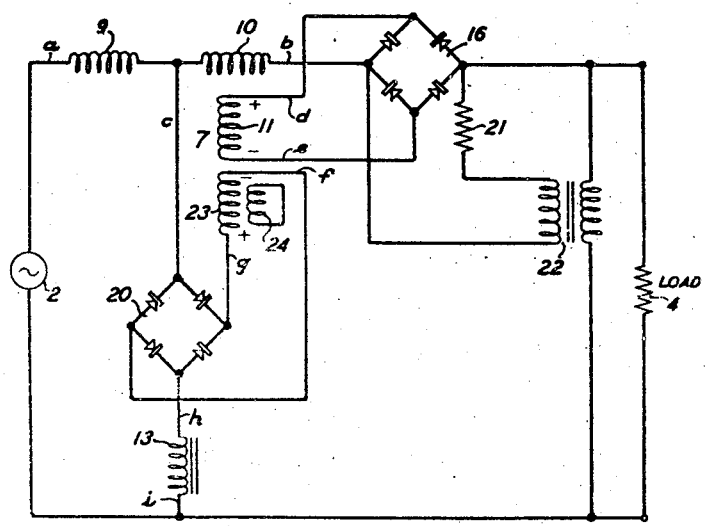
Fig. 1 is a diagrammatic view of an alternating current voltage regulator constructed in accordance with the invention.

Referring to the drawing, there is shown a circuit for supplying alternating current from a supply source 2 to a load 4 and for controlling the current supplied to the load to tend to maintain the load voltage constant irrespective of changes in line voltage and changes of load. The alternating current is supplied to the load through a path comprising windings 9 and 10 of a saturable reactor 7 and a bridge rectifier 16 all connected in series with respect to the source. Current from the source 2 is also supplied to a branch current path comprising a bridge rectifier 20 and the winding of a saturated reactor 13 in series, one terminal of the branch path being connected to the common terminal of windings 9 and 10 and the other terminal being connected to the side of the line which directly connects a terminal of the source 2 to a terminal of load 4. If desired, this branch circuit may be connected to the input terminals of the regulating circuit, that is, across the line connected to the source 2. The bridge rectifier 16 supplies to a direct current winding 11 on the core of reactor 7 a rectified current having variations corresponding to current changes through the load. In order to operate at a suitable level of direct current flux in the core of reactor 7, current is also supplied to the rectifier 16 through a circuit including a resistor 21 connected to the secondary winding of a transformer 22 the primary winding of which is connected to the load terminals. The bridge rectifier 20 supplies to a direct current winding 23 on the core of reactor 7 a rectified current having variations corresponding to current changes in the circuit including the winding of reactor 13, the current in this circuit varying in accordance with voltage changes across the line connecting the regulating circuit to the source 2. A short-circuited winding 24 is also provided on the portion of the core on which windings 11 and 23 are wound to reduce or suppress alternating components of the flux in this portion of the core due to ripples in the rectified currents supplied to windings 11 and 23.

Figure 2:
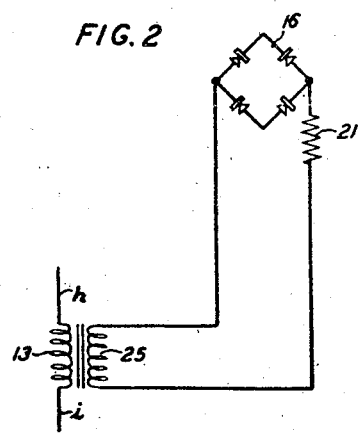
Fig. 2 is a diagrammatic view of a modification of a portion of the regulator shown in Fig. 1.

If desired, as shown in Fig. 2, a saturated reactor-transformer having a primary winding 13 connected to leads $h$ and $i$ in place of the reactor 13 of Fig. 1 and having a secondary winding 25 may be employed for supplying a relatively steady current component to the rectifier 16, thus making unnecessary the use of a separate transformer 22 as shown in Fig. 1.

Figure 3:
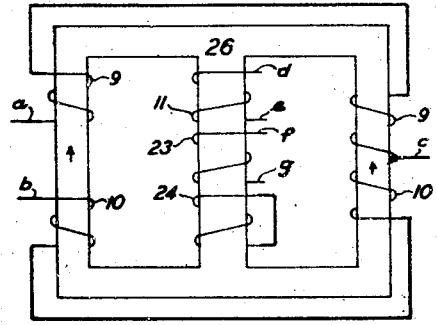
Fig. 3 is a diagrammatic view showing in greater detail an inductance device used in the regulator of Fig. 1.

The saturable reactor 7 is shown in greater detail in Fig. 3. It comprises a three-legged core 26 of magnetic material, windings 9 and 10 arranged upon the outer legs of the core and the windings 11, 23 and 24 on the middle leg, the leads $a$, $b$ and $c$ connected to windings 9 and 10, leads $d$ and $e$ of winding 11 and leads $f$ and $g$ of winding 23 being connected in the regulator circuit as shown in Fig. 1. The windings 9 and 10 set up aiding magnetomotive forces in the magnetic circuit including the outer legs of the core due to the load current flowing through these windings in series. The windings 11 and 23 set up opposing magnetomotive forces in the middle leg of the core due to the direct currents supplied to the windings respectively, the magnetomotive force due to winding 11 being larger than the magnetomotive force due to winding 23. The resultant magnetomotive force in the middle leg causes direct current flux to flow through each of the outer legs in directions indicated by the arrows in Fig. 3. The resultant direct current flux in each of the two portions of the magnetic circuit including the outer legs respectively, varies due to changes of current supplied to windings 11 and 23 to control the impedance of windings 9 and 10. The alternating current supplied to the load through windings 9 and 10 is thus controlled to minimize changes of load voltage.

If the load current increases, for example, it being assumed that the line voltage is of constant amplitude, the direct current supplied to winding 11 increases to cause the direct current flux in the magnetic circuit to increase and thus reduce the impedance of windings 9 and 10. The load voltage is thus maintained at a substantially constant amplitude although the voltage drop in portions of the supply circuit other than windings 9 and 10 increases due to the increased load. If the load is assumed to be constant and the line voltage increases, for example, the direct current flux of the magnetic circuit of windings 9 and 10 is reduced due to the increased rectified current supplied to winding 23. As a result the impedance of windings 9 and 10 is increased to the extent required to compensate for the increased line voltage, the alternating voltage across the load remaining substantially constant.

In a circuit of the type shown and described, the core 26 of the saturable reactor 7 was made up of a two-inch stack of EI–13A Allegheny Super Dynamo, 24 gauge, laminations 50 per cent interleaved. The windings 9 and 10 each had 204 turns, the winding 11 had 270 turns, the winding 23 had 500 turns, and the winding 24 had 32 turns. The saturated transformer 13, 25 had a core made up of thirteen laminations of the type just described (0.30 inch stack) 100 per cent interleaved. The winding 13 had 1,600 turns and the winding 25 had 50 turns. The resistor 21 had a resistance of 17.6 ohms. The following data was obtained in a test made on this circuit. When the alternating line voltage varied from 210 to 300 volts and the load current varied from 0.35 to 0.435 ampere, the load voltage varied from 177.5 to 200 volts. When the line voltage varied from 210 to 300 volts and the load current varied from 0.72 to 0.89 ampere, the load voltage varied from 174 to 204 volts. When the line voltage varied from 210 to 300 volts and the load current varied from 1.07 to 1.31 amperes, the load voltage varied from 170 to 204 volts. When the line voltage varied from 210 to 300 volts and the load was a 1,500 ohm fixed resistor, the load voltage varied from 179.5 to 200 volts.

What is claimed is:

1. Means for controlling the current supplied to a load from an alternating current source to minimize load voltage changes due to voltage changes of said source comprising a first reactor having a first winding through which current from said source is supplied to the load and having a magnetic circuit for said winding, a current path comprising a rectifier and a second reactor, means for supplying current from said source to said path, said second reactor operating in a saturated region of its magnetizing characteristic so that the rate of change of current in said path with respect to the voltage of said source is high, said first reactor having a second winding, and means for controlling the impedance of the first winding of said first reactor comprising means for supplying rectified current from said rectifier to the second winding of said first reactor.

2. Means for controlling the current supplied to a load from an alternating current supply line comprising a reactor having a first, a second and a third winding wound on a magnetic core, said first winding being connected in said supply line in series with the load with respect to the source, means for producing and supplying to said second winding a direct current the amplitude of which changes in response to load current changes for causing a direct current flux to flow in the portion of the core on which said first winding is wound, and means for producing and supplying to said third winding a direct current the amplitude of which changes in response to line voltage changes for causing to be set up in said core a direct current magnetomotive force for reducing the direct current flux in said core, the magnetomotive force set up in said core due to the direct current in said second winding always being larger during operation than the magnetomotive force set up in said core due to the direct current in said third winding.

3. Voltage regulating apparatus having input terminals connected to an alternating current supply line and output terminals connected to a load, a first reactor having two alternating current windings connected in series in one side of the supply line wound upon a core of magnetic material, said load current flowing through said windings to cause aiding alternating magnetomotive forces to be set up in a magnetic circuit of said core, a first and a second direct current winding on said core for setting up in response to direct currents supplied to said windings respectively opposed direct current magnetomotive forces in said core to cause a resultant direct current flux to flow in the portions of said core on which said alternating current windings are wound, the magnetomotive force due to said first direct current winding being larger than the magnetomotive force due to said second direct current winding, a first rectifying means for supplying to said first direct current winding a direct current having amplitude changes corresponding to load current changes, there being supplied to said rectifying means said load current and a substantially constant amplitude alternating current in phase with the load current, a reactor-transformer having a primary and a secondary winding, a current path comprising a second rectifying means and the primary winding of said reactor-transformer in series, one terminal of said path being connected to the common terminal of said alternating current windings of said first reactor and the other terminal of said path being connected to the other side of said supply line, said second rectifying means supplying to said second direct current winding of said first reactor direct current the amplitude of which varies in response to amplitude changes of the alternating current flowing through said current path, the secondary winding of said reactor-transformer being connected to said first rectifying means for supplying thereto said substantially constant amplitude alternating current, said first reactor operating in a region of its magnetizing characteristic in which the rate of change of impedance of its alternating current windings with respect to the direct current flux of its core is large, said reactor-transformer operating in a region of its magnetizing characteristic in which the rate of change of voltage across a winding thereof with respect to the current flowing through its primary winding is small.

4. In combination with means for supplying current from an alternating current source to a load of means for minimizing load voltage changes comprising a first reactor having a core of magnetic material, a first winding connected in said load circuit in series with the load and a second and a third winding which are energized by direct current for controlling the impedance of said first winding, a first rectifying means energized by current in said load circuit for supplying to said second winding a direct current which varies with changes of load current, a current path comprising in series a second rectifying means and the winding of a second reactor, means for impressing across said path an alternating voltage which varies in response to voltage changes of said source, and means for supplying unidirectional current from said second rectifying means to said third winding of said first reactor, the currents flowing in said second and third windings, respectively, causing opposing magnetomotive forces to be set up in said core.

WILLIAM H. BIXBY.